United States Patent [19]

Dinerman et al.

[11] 3,828,320

[45] Aug. 6, 1974

[54] SHARED MEMORY ADDRESSOR

[75] Inventors: Bernard B. Dinerman, Norristown; Franklin T. Schroeder, Exton, both of Pa.

[73] Assignee: Burroughs Corporation, Detroit, Mich.

[22] Filed: Dec. 29, 1972

[21] Appl. No.: 319,533

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,629,846 | 12/1971 | Thompson | 340/172.5 |
| 3,697,959 | 10/1972 | Abramson et al. | 340/172.5 |
| 3,731,285 | 5/1973 | Bell | 340/172.5 |
| 3,735,354 | 5/1973 | Delaney | 340/172.5 |
| 3,745,532 | 7/1973 | Erwin | 340/172.5 |
| 3,768,077 | 10/1973 | Nier et al. | 340/172.5 |

*Primary Examiner*—Harvey E. Springborn
*Attorney, Agent, or Firm*—John J. Simkanich; Edward J. Feeney, Jr.; Edward G. Fiorito

[57] ABSTRACT

An access unit for a shared memory for use in a microprogrammable processor is provided utilizing a multiplexing scheme. Two functionally different inputs, one for data, the other for microinstructions are exclusively gated to memory in synchronization with microprogram control timing cycles to permit accessing the memory at separate times via a single channel.

4 Claims, 6 Drawing Figures

SHARED MEMORY ADDRESSOR

BACKGROUND OF THE INVENTION

Microinstruction algorithms for a digital computer having a microprogram configuration were proposed more than 20 years ago but it was not until the last decade that specific microinstruction processors were developed. At first these machines offered read-only microinstruction memories, but now many microinstruction machines (like the Burroughs B1700) offer read-write microinstruction memories.

The computing industry's drive for simpler and more versitile microprogrammable processors has fostered many microprogram processor improvements including the "shared memory" wherein both the microinstructions and the data they operate upon for the implementation of machine macroinstructions are stored in the same memory. Typically, a processor's microprogram-control addresses this memory to fetch microinstructions in the sequence of execution. Data is then fetched as called for by a microinstruction. In these machines both microinstructions and data are addressed to shared memory from separate locations in the processor.

The present generation of microinstruction machines has introduced microprogrammable emulation processors in which microinstructions are entered to emulate another machine. These machines are required to have the ability of automatically and quickly storing and accessing both data and microinstructions in a central shared memory in the performance of the emulation program. The design of the address-unit for the shared memory is therefore important.

Prior art (Class 340, subclass 172.5) teaches various shared memory address-units. Corden, U.S. Pat. No. 3,599,176 teaches a storage address assembler coupled with an address decoder as a shared memory address-unit; while Dunbar, U.S. Pat. No. 3,651,475 and Malmer, U.S. Pat. No. 3,725,868, teach an assembler coupled with an address register, and an adder coupled with a base register, respectively, as shared memory address-units. These address-unit inventions, however, are not simple enough, nor economical enough, and do not have a fast enough operating speed for some applications. It takes time for signals to ripple through an assembler and a decoder, or an assembler and an address register comparison, or an adder unit and a base register comparison.

What is desired therefore, is a relatively simple, economical and fast-operating address-unit for a shared memory in which two distinct types of information, including microprogram instructions, may be stored in the same continguous memory unit in varying proportions, and wherein each of the two tpes of information are obtained via separate addressing sources.

It is also desired that this information access the memory in synchronization with microprogram control timing pulses.

In addition, it is desired that both types of information access the memory via a single channel.

SUMMARY OF THE INVENTION

The objectives of this invention are accomplished by a multiplexing-address-unit for a shared memory wherein two discrete addressing channels, one for microinstructions and one for data, are multiplexed to a shared, data-microinstruction, memory exclusively (or at alternate times), being gated in synchronization with microprogram control timing cycles. This arrangement permits dual access to the memory via a single channel in order that a position in shared memory may be accessed by either channel, so multiplexed, in order that any amount of the storage may be allocated as data storage or microinstruction storage without physical alteration to the address unit or alteration in its method of operation, and this may be accomplished with minimal cost.

Each discrete microinstruction channel or data channel, consisting of a multiplicity of lines to define the specific memory address to be accessed, is gang "AND-gated" into memory when a respective microprogram access signal or data access signal is received by the address unit and when these address unit gates are clocked by a timing pulse.

DESCRIPTION OF THE DRAWINGS

The features of this invention as well as its method of operation will become more fully apparent from the following detailed description, attached claims and accompanying drawings in which like characters refer to like parts, and in which:

DETAILED DESCRIPTION OF THE INVENTION

Figure 1:
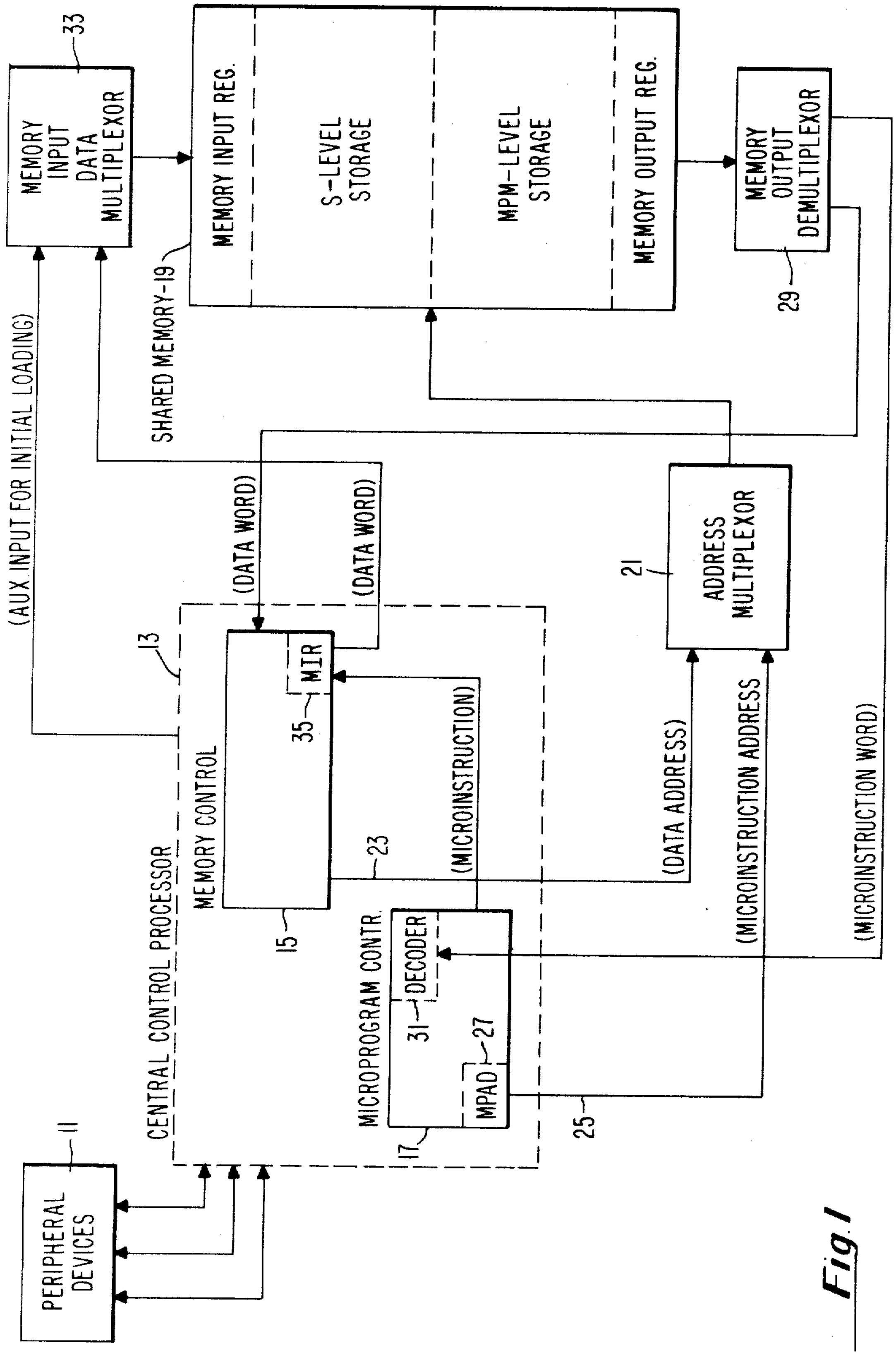
FIG. 1 is a block diagram of the multiplexing address-unit, including memory input multiplexing and output demultiplexing, showing the relation to the shared memory and the central control unit of the processor.

The preferred embodiment of the invention as shown in FIG. 1 operates within a microprogrammable digital computer having peripheral devices 11 tied to a central processor unit 13. Processor 13 includes memory control 15 and microprogram control 17. The computer also has a 64K, 16 bit word, core memory unit 19 (Burroughs Memory 1447 - 9018, Jan. 1972) which is used to store both data ("S" level) and microprogram ("MPM" level) in separable portions separated by an "effective" boundary.

The invention includes address multiplexor 21 which operates upon data address signals 23 and microinstruction address signals 25 to address locations in the shared memory 19 on an absolute basis. Data address signals 23 are received by multiplexor 21 from memory control unit 15 while microinstruction address signals 25 are received from the microprogram address register 27 of microprogram control 17.

Having accessed an address in memory 19 a word is read out of the output register of memory 19 into memory output demultiplexor 29 which in turn sends data words to memory control 15 (for distribution to the CPU) and microinstruction words to microinstruction decoder 31 in microprogram control 17.

Data and microprograms may be input into memory 19 from peripheral devices 11 via central processor unit 13 and memory input multiplexor 33.

Figure 2:
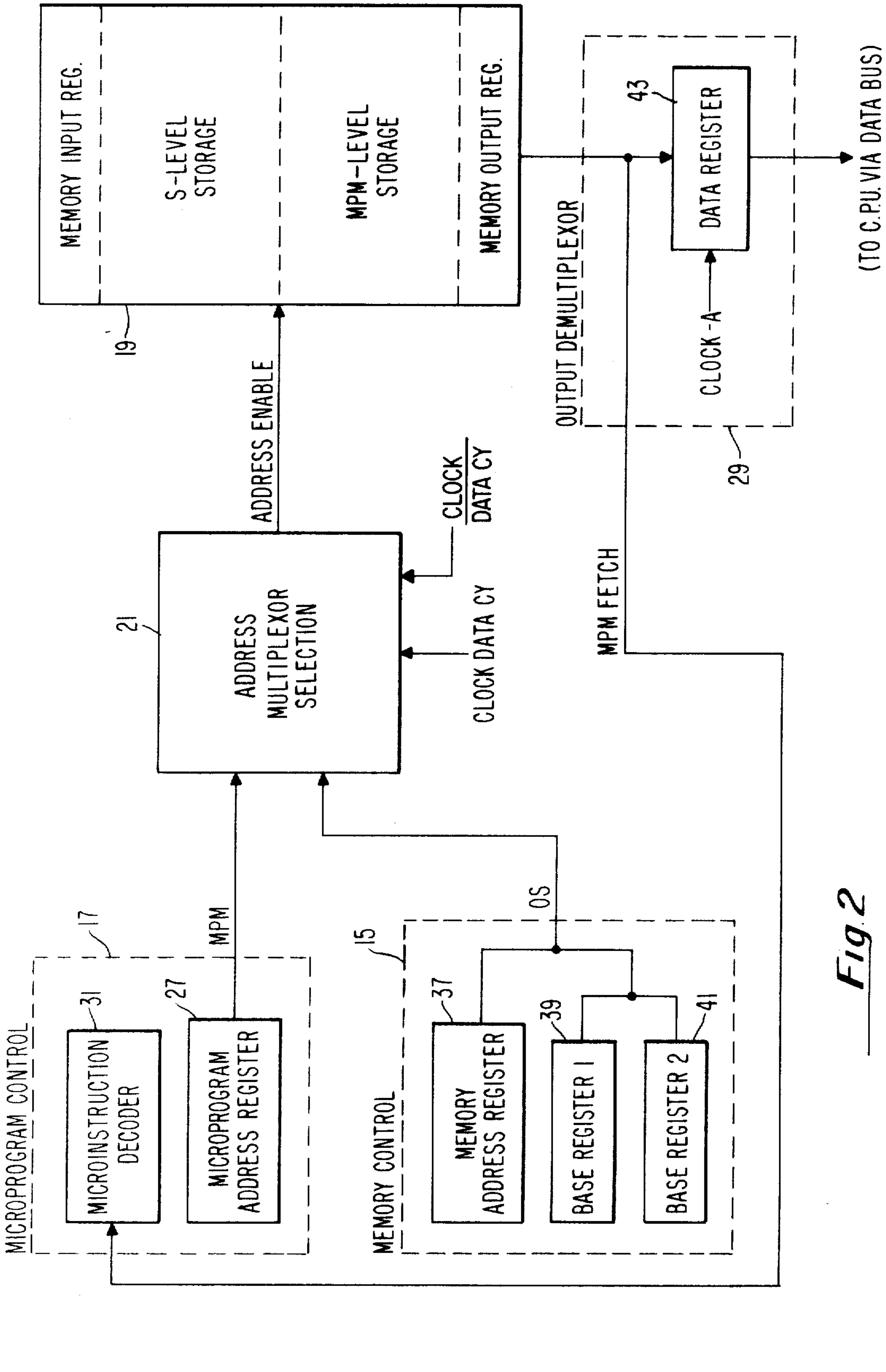
FIG. 2 shows the address-multiplexor including the output demultiplexor with respect to the signal lines into and out of each.

Address multiplexor 21, FIG. 2, multiplexes microinstruction addresses from microprogram address register 27, in microprogram control 17, and data addresses from memory address register 37, including base registers 39 and 41 of memory control 15 as a function of data cycle signal. Output demultiplexor 29 demultiplexes the words read out of memory 19 during a "$\overline{\text{data cycle}}$" to the microinstruction decoder 31 in microprogram control 17, and to data register 43 during a "data cycle."

Figure 3:
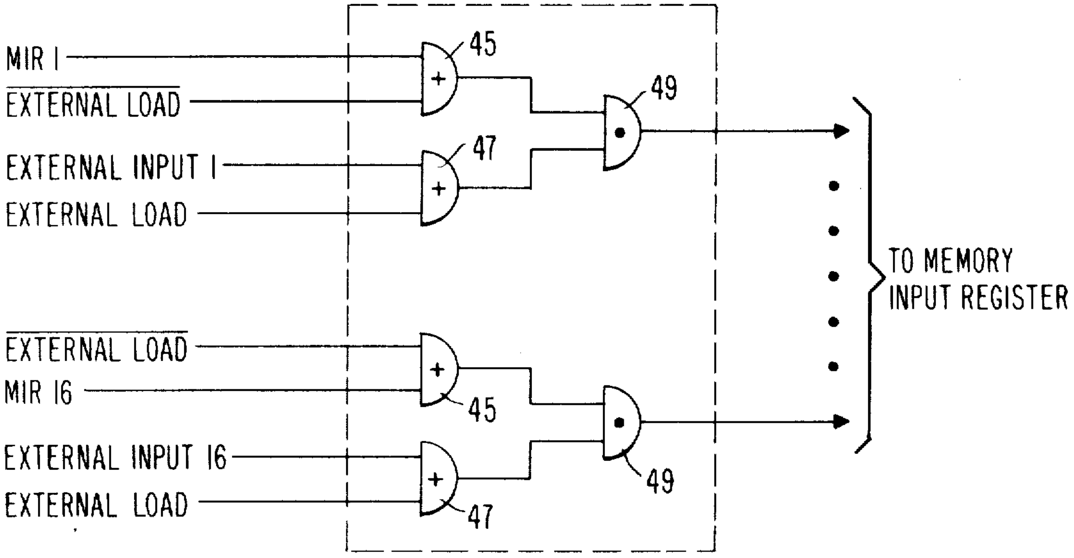
FIG. 3 is a block diagram of the memory input multiplexor.

Input multiplexor 33 (FIG. 3) includes 16 "and" gates 45 which pass a 16 bit word from MIR 35 (FIG. 1) when enabled by "$\overline{\text{external load}}$" signal. 16 "and" gates 47 pass a 16 bit externally input word when enabled by "external load" signal. A MIR word or external input word from gates 45, 47 is "ored" via 16 "or" gates 49 to memory 19 (FIG. 1).

Figure 4:
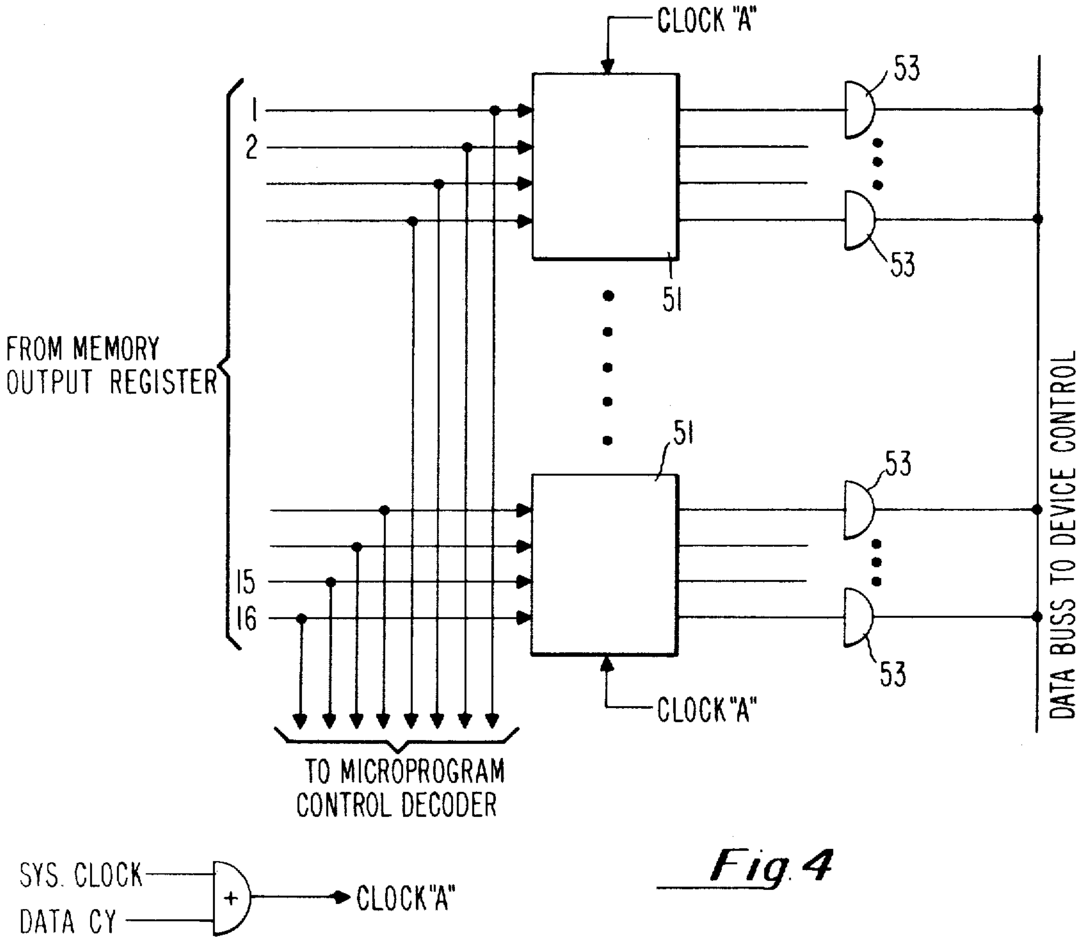
FIG. 4 is a block diagram of the memory output multiplexor.

Output demultiplexor 29 (FIG. 4) has four 4-input "9300-Type" register chips 51 shift register chips produced by Fairchild Manufacturing Company in 1969, which receive inputs from memory 19 and which are clocked by clock signal A. Clock "A" as shown in FIG. 4 is the "data-cycle" signal synchronized with system clock. Outputs of these chips 51 go each to an open collector circuited gate 53 which connects an external data bus.

Figure 5:
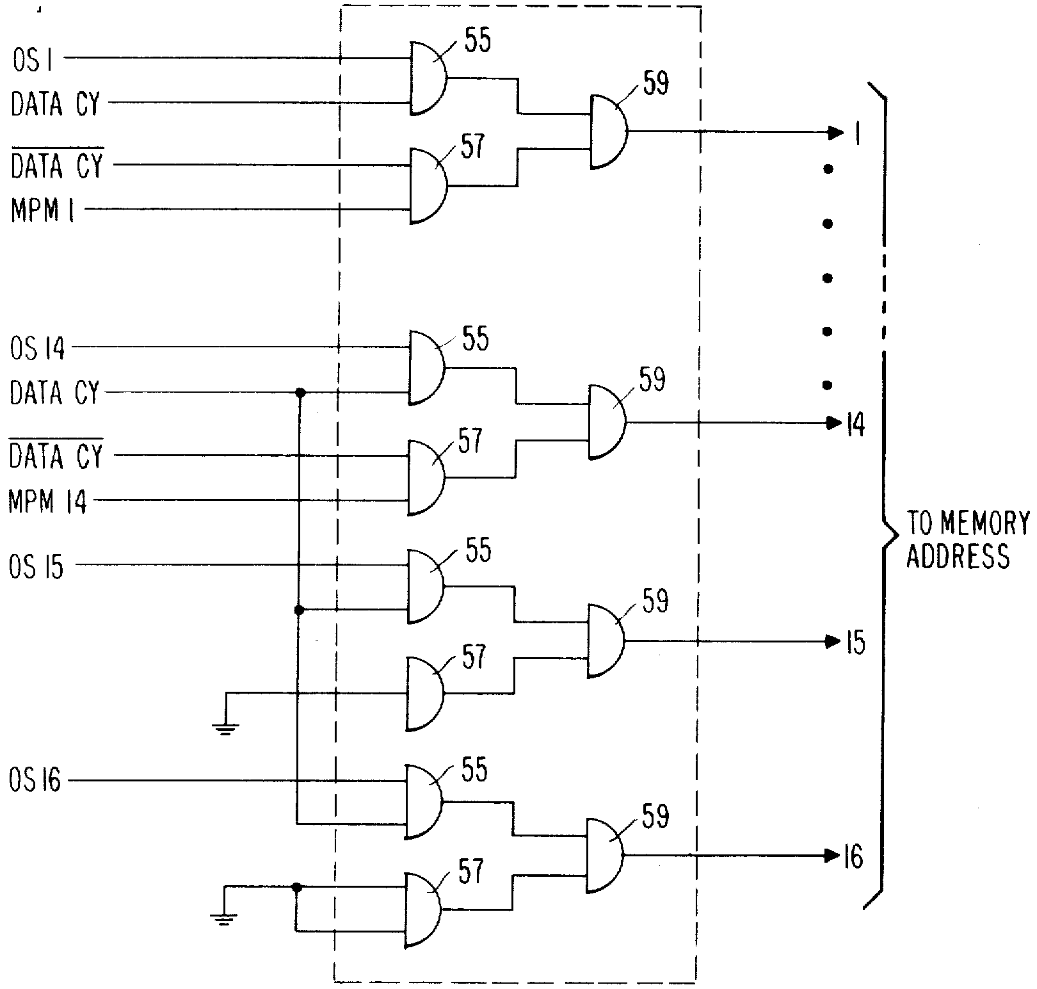
FIG. 5 is a block diagram of the address multiplexor.
Figure 6:
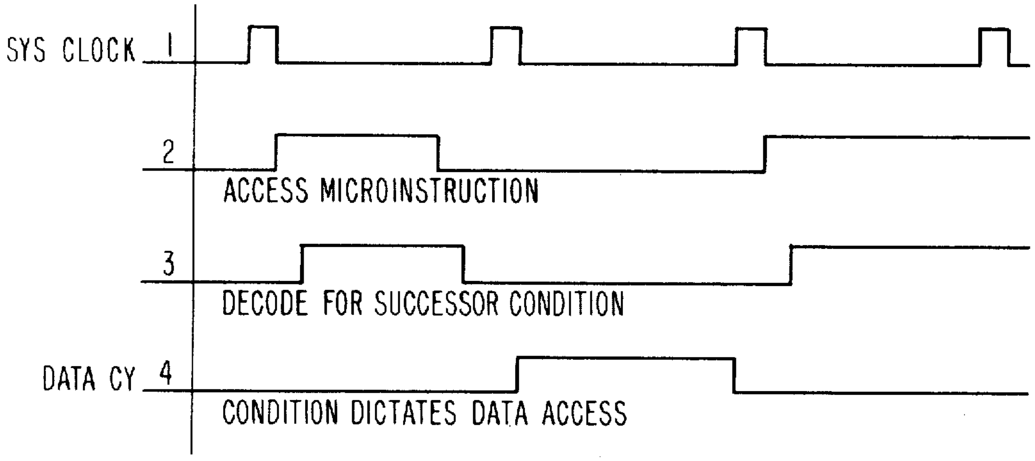
FIG. 6 is a timing diagram illustrating signals of interest in the operation of the invention.

Address multiplexor 21 (FIG. 5) includes 16 "and" gates 55 which pass the 16 bit data address when enabled by a $\overline{\text{data cycle}}$ signal; and 14 "and" gates 57 which pass a 14 bit microinstruction address when enabled by data cycle signal. Each of the data and microinstruction bits from gates 55, 57 respectively, are then "or'ed" via "or" gates 59 to enable a memory 19 address.

If as a result of the decoding of a microinstruction the microprogram control determines that data must be read from memory, a "data cycle" signal is generated for the next system clock period. A "data cycle" signal suppresses microinstruction activity (access and decode) for that system clock time. "$\overline{\text{Data cycle}}$" exists only when a "data cycle" signal does not exist.

The operation of each of the multiplexors is a function of (clocked) the system clock pulse and of either the "data cycle" signal or "$\overline{\text{data cycle}}$" signal.

A very simple and economical apparatus is therefore obtained for addressing a shared memory and which also has the decided advantage fast operation i.e., relatively little time delay in the passage of signals through the device.

What is claimed is:

1. In a microprogrammable parallel bit digital computer; having a shared memory for storing information which includes both microinstructions and data-words in separable portions therein and having a central processor associated with said memory, said processor including a memory control wherein said memory control has a memory input register for feeding said shared memory, said processor also including a microprogram control for storing both microinstructions and data-words in separable portions therein which includes a microprogram address register and a memory address register each of which addresses microinstruction locations and data locations of said memory respectively, said processor also including timing circuitry for generating a "$\overline{\text{data-cycle}}$" signal and a data cycle signal and an "external-load" signal and a $\overline{\text{external load}}$ signal; and peripheral devices; an improved memory addressing unit comprising:

first multiplexing means coupled to said microprogram address register, said memory address register and said shared memory for feeding microinstruction addresses from said microprogram address register and data addresses from said memory address register to said shared memory via common memory address lines;

second multiplexing means connected to said processor including said memory input register and said timing circuitry for feeding information from said peripheral devices or said central processor to said memory via common memory input lines; and demultiplexing means associated with said memory control, said microprogram control, said memory and said timing circuitry for separating information from said memory into data words for said memory control and microinstruction words for said microprogram control.

2. The apparatus of claim 1 wherein said first multiplexing means comprises:

a first plurality of "and" gates, each having an input connected to respective bit portions of said memory control and each being enabled on another input by said "data-cycle" signal from said timing circuitry to pass a data word address bit;

a second plurality of "and" gates each having an input connected to respective bit positions of said microprogram control and each being enabled on another input by said "$\overline{\text{data-cycle}}$" signal to pass a microinstruction address bit; and a first plurality of "or" gates each being connected to a respective address bit position of said first plurality of "and" gate and also to a corresponding address bit position one of said second plurality of "and" gate, the output of each of said "or" gates being connected to respective memory address lines of said memory.

3. The apparatus of claim 2 wherein said demultiplexing means comprises:

a plurality of parallel shift registers, an input of each of said shift registers being connected to a respective output word bit position of said shared memory, said registers being clocked to pass said information by the presence of said "data-cycle" signal from said timing circuitry;

a plurality of groups of interfacing gates, each of said gates within a group being fed by a respective output bit position of a said shift register connected to said group;

a data bus connected to each of said outputs of said plurality of interfacing gates and said memory control;

a plurality of word information lines, each line being individually connected between a respective word bit position input of said plurality of shift registers and said microprogram control.

4. The apparatus of claim 3 wherein said second multiplexing means comprises:

a third plurality of "and" gates each having a respective input connected to said central processor and being enabled to pass a word from said central processor by the presence of said "external-load" signal on the another input;

a fourth plurality of "and" gates each having a respective input connected to a bit position of said memory input register and being enabled to pass a word from said peripheral devices by said external load signal said timing circuitry on another input; and a second plurality of "or" gates each being connected to a respective one of said third plurality of "and" gates and to respective one of said fourth plurality of "and" gates, the output of a respective one of said "or" gates being connected to a respective one of said shared memory inputs.

* * * * *